UNITED STATES PATENT OFFICE.

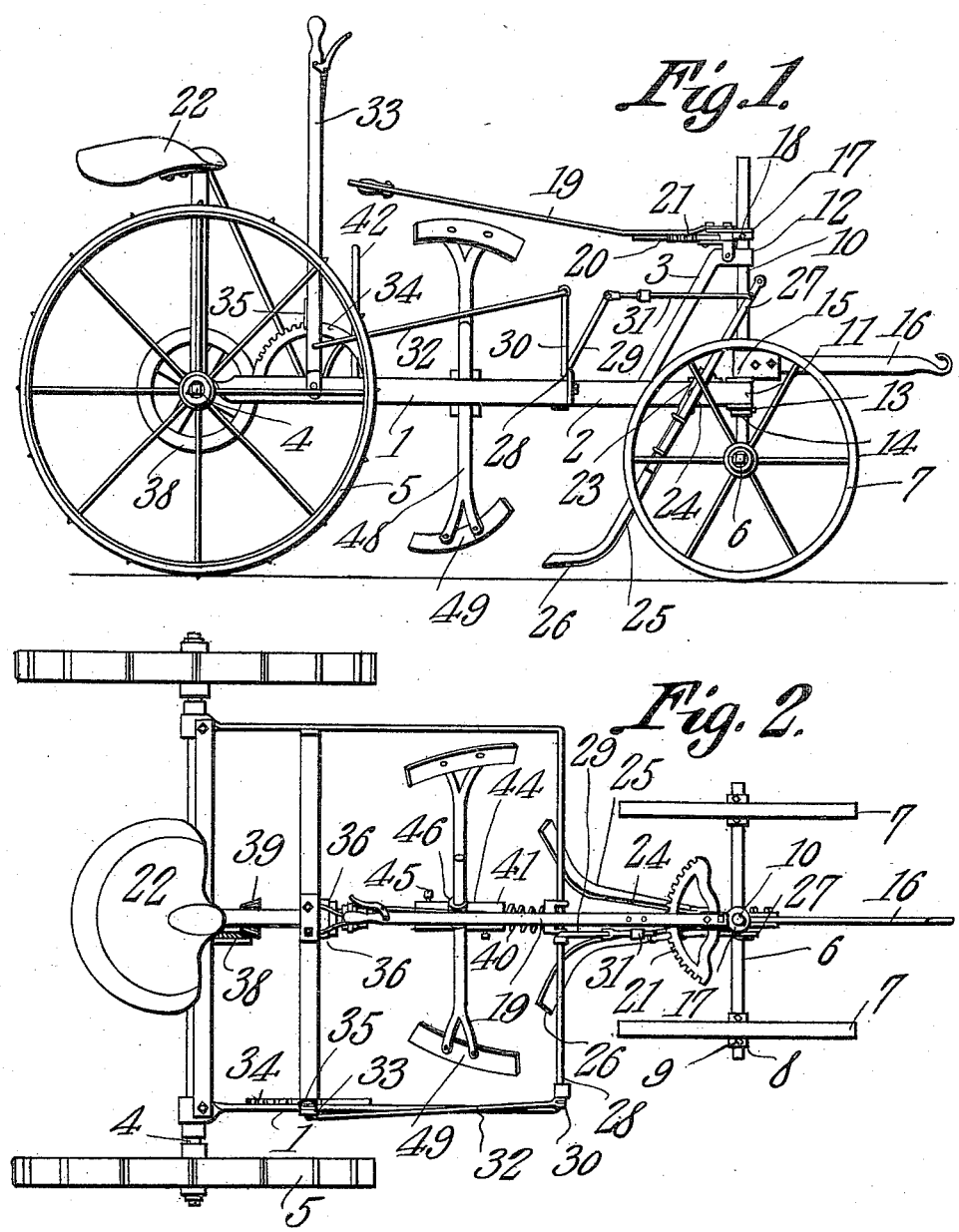

PEET CARLSON, OF CARLSON, TEXAS.

COTTON-CHOPPER.

986,137.　　　　Specification of Letters Patent.　　Patented Mar. 7, 1911.

Application filed February 26, 1910. Serial No. 546,074.

*To all whom it may concern:*

Be it known that I, PEET CARLSON, a citizen of the United States, residing at Carlson, in the county of Travis and State of Texas, have invented a new and useful Cotton-Chopper, of which the following is a specification.

This invention has relation to cotton choppers and it consists in the novel construction and arrangement of parts hereinafter shown and described.

The object of the invention is to provide a machine especially adapted to be used for thinning cotton in a row and includes means for accurately trimming the soil at both sides of the row of plants just prior to the time that the separate plants are chopped from the row. Means is provided for adjusting the said trimming device so that the same may operate at any desired distance below the surface of the soil, and means is provided for adjusting the frame of the chopper vertically so that the chopping blades may cut at any desired depth below the surface of the soil.

In the accompanying drawings,—Figure 1 is a side elevation of the cotton chopper. Fig. 2 is a top plan view of the same.

The cotton chopper includes an approximately rectangular frame 1 having a forward extension 2 upon which is mounted an upwardly disposed bracket 3. An axle 4 is journaled for rotation at the rear portion of the frame 1 and traction wheels 5 are mounted upon the end portions of the said axle 4. The supports for the forward portion of the frame 1 and its attachments consist of a relatively short axle 6 having ground wheels 7 journaled upon its end portions. Collars 8 are mounted upon the axle 6 and are held in adjusted position thereon by means of set screws 9 and are located at opposite sides of the hub of the ground wheels 7. Thus means is provided for shifting the ground wheels 7 along the axle 6 in order that they may be spread apart or brought together as desired. A vertical standard 10 is mounted upon the intermediate portion of the axle 6 and is journaled in a bearing 11 provided at the forward end of the frame extension 2 and a bearing 12 located at the upper end of the bracket 3. A collar 13 is located upon the lower portion of the standard 10 and is held in an adjusted position thereon by means of a set screw 14. The lower side of the bearing 11 rests upon the top of the collar 13 and thus it will be seen that by adjusting the collar 13 along the standard 10 the forward portion of the frame 1 and its connection may be raised or lowered as desired. A sleeve 15 is loosely mounted upon the intermediate portion of the standard 10 and is located between the bearings 11 and 12. A clevis 16 is connected with the sleeve 15 by means of which draft animals may be attached. A collar 17 is fixed to the upper portion of the standard 10 by means of a set screw 18. Thus the said collar 17 may be adjusted along the upper portion of the standard and secured in an adjusted position. A lever 19 is fulcrumed at one end to the collar 17 and is provided with an ordinary spring pawl 20 adapted to engage the teeth of a gear segment 21 which is fixed to the upper portion of the bracket 3. The rear end of the lever 19 is located in convenient reach of one occupying a seat 22 which is mounted upon the frame 1. Thus it will be seen that by swinging the lever 19 horizontally the standard 10 will be turned upon its axis whereby the axle 6 will be swung about the axis of the said standard and the ground wheels 7 guided. Also the pawl 20 engages the teeth of the segment 21 so that the ground wheels 7 may be held in any desired vertical plane with relation to the line of draft of the machine.

The frame extension 2 is provided at its forward portion with a bearing 23 in which is journaled the intermediate portion of a yoke 24. Blades 25 are attached to the blades of the yoke 24 and are provided with lower curved extremities 26 which are disposed outwardly toward their rear end. An arm 27 is attached to the side of the yoke 24 and is upwardly disposed. A shaft 28 is journaled upon the forward portion of the frame 1 and is provided at its ends with cranks 29 and 30. A link 31 operatively connects the end of the crank 29 with the end portion of the arm 27 and a link 32 operatively connects the crank 30 with a lever 33 which is fulcrumed upon the frame 1. A toothed segment 34 is mounted upon the frame 1 adjacent the lever 33 and its teeth are adapted to be engaged by a spring pawl 35 carried by the lever 33. Thus it will be seen that by swinging the lever 33 the link 32 will be moved longitudinally whereby the shaft 28 will be rocked upon its axis and the link 31 moved longitudinally and through the arm 27 the yoke 24 will be swung in the bearing 23 so that the blades 26 may be forwardly or rearwardly disposed as desired. The said blades are adapted to move along the opposite sides of a row of standing plants and clean the soil at the sides of the row and cast the same away from the row. By the adjustment stated it is possible to cause the blades to operate at any desired distance below the surface of the soil, although the blades may be so positioned that they will be entirely above the surface of the soil.

The frame 1 is provided with bearings 36 in which a shaft 37 is slidably journaled. A beveled gear wheel 38 is fixed to the axle 4 and meshes with a beveled pinion 39 fixed to the rear end of the shaft 37. A coiled spring 40 is interposed between the forward bearing 36 and a shoulder 41 carried by the shaft 37 and the said coiled spring is under tension with a tendency to hold the shaft 37 in a rearward position so that the pinion 37 is normally in mesh with the gear wheel 38. A lever 42 is fulcrumed upon the frame 1 of the standard and its lower end lies between collars fixed to the shaft 37. Thus it will be seen that by swinging the lever 42 the shaft 37 will move longitudinally against the tension of the spring 40 whereby the beveled pinion 39 will be carried out of mesh with the beveled gear wheel 38.

A collar 44 is fixed to the intermediate portion of the shaft 37 by means of set screws 45 and the said collar 44 is provided at its opposite sides with collars 46 which are disposed at right angles to the said collar 44. The collars 46 are provided with set screws 47. Hoe shafts 48 pass through the collars 46 and are secured in adjusted position therein by means of the set screws 47. Hoe blades 49 are carried at the outer end of the hoe shaft 48.

Thus it will be seen that an especially designed cotton chopper structure is provided and means is provided for adjusting the parts of the chopper to meet requirements and to operate upon the crop to the best advantage.

Having thus described the invention what I claim as new and desire to secure by Letters Patent is:—

A cotton chopper comprising an approximately rectangular frame having a forward extension provided at its forward end with a bearing, supporting wheels journaled for rotation at the sides of the rear portion of said frame, a bracket mounted upon said extension and having a bearing at its upper forward end, a standard journaled in the bearings of the extension and bracket, an axle fixed to the lower end of said standard, ground wheels journaled upon said axle, a lever adjustably fixed to the standard, a spring pawl carried by the lever, a toothed segment fixed to the bracket and adapted to be engaged by the pawl, a sleeve slidably mounted upon said standard between the bearing at the extension of the frame and the bearing at the forward end of the bracket, and a draft means connected with said sleeve.

In testimony that I claim the foregoing as my own, I have hereto affixed my signature in the presence of two witnesses.

PEET CARLSON.

Witnesses:
CHAS. A. ANDERSON,
AUG. HOLMBERG.

---

Copies of this patent may be obtained for five cents each, by addressing the "Commissioner of Patents, Washington, D. C."